United States Patent
Shenfield et al.

(10) Patent No.: US 9,778,813 B2
(45) Date of Patent: Oct. 3, 2017

(54) MANIPULATING SCREEN LAYERS IN MULTI-LAYER APPLICATIONS

(75) Inventors: Michael Shenfield, Richmond Hill (CA); Arnold Sheynman, Northbrook, IL (US)

(73) Assignee: BlackBerry Limited, Waterloo, ON (CA)

( * ) Notice: Subject to any disclaimer, the term of this patent is extended or adjusted under 35 U.S.C. 154(b) by 68 days.

(21) Appl. No.: 14/237,398

(22) PCT Filed: Aug. 9, 2011

(86) PCT No.: PCT/US2011/047033
§ 371 (c)(1),
(2), (4) Date: Feb. 6, 2014

(87) PCT Pub. No.: WO2013/022431
PCT Pub. Date: Feb. 14, 2013

(65) Prior Publication Data
US 2014/0173721 A1    Jun. 19, 2014

(51) Int. Cl.
*G06F 21/32* (2013.01)
*G06F 3/0481* (2013.01)
(Continued)

(52) U.S. Cl.
CPC .......... *G06F 3/04815* (2013.01); *G06F 3/016* (2013.01); *G06F 3/0482* (2013.01);
(Continued)

(58) Field of Classification Search
CPC .............. H04L 9/32; H04L 9/00; G06F 21/30
(Continued)

(56) References Cited

U.S. PATENT DOCUMENTS 8,316,237 B1 *  11/2012  Felsher ................. H04L 9/0825
                                                        380/282
8,629,851 B1 *   1/2014  Park .................... G06F 3/04883
                                                        178/18.01
(Continued)

FOREIGN PATENT DOCUMENTS

| EP | 1873702 | 1/2008 |
| GB | 2477017 | 7/2011 |
| WO | WO 2009/085338 | 7/2009 |

OTHER PUBLICATIONS

International Search Report and Written Opinion of the International Searching Authority issued in International No. PCT/US2011/047033 on Apr. 19, 2012; 19 pages.
(Continued)

*Primary Examiner* — Christopher Revak
(74) *Attorney, Agent, or Firm* — Fish & Richardson P.C.

(57) ABSTRACT

A method performed on a device includes receiving, from a user, a finger-touch-initiated request for access to a layer of a multi-layer application on the device, the multi-layer application having a plurality of user interface layers. The method may also include identifying a finger of the user used to provide the finger-touch-initiated request, the finger associated with one of the layers of the multi-layer application. The layer associated with the identified finger of the user may be operated on. Each finger of the user can be associated with a different layer of the multi-layer application. Fingerprints can be used to differentiate each finger and/or to identify the user by fingerprint recognition techniques. Fingerprints can be used to vary the access parameters of a layer of the application and/or to provide security levels for accessing the layers of the multi-layer application.

51 Claims, 3 Drawing Sheets

(51) Int. Cl.
*G06F 3/0488* (2013.01)
*G06F 3/01* (2006.01)
*G06F 3/0482* (2013.01)
*G06F 3/0484* (2013.01)

(52) U.S. Cl.
CPC ........ *G06F 3/0488* (2013.01); *G06F 3/04842* (2013.01); *G06F 21/32* (2013.01); *G06F 2203/04804* (2013.01); *G06F 2221/2113* (2013.01)

(58) Field of Classification Search
USPC ........ 726/21–25, 28; 715/702–781; 382/124; 345/174
See application file for complete search history.

(56) References Cited

U.S. PATENT DOCUMENTS

| | | | | |
|---|---|---|---|---|
| 8,736,001 | B2* | 5/2014 | Salatino | G06K 9/00053 257/415 |
| 9,542,783 | B2* | 1/2017 | Slaby | G07C 9/00079 |
| 2008/0092245 | A1* | 4/2008 | Alward | G06F 21/316 726/28 |
| 2009/0199127 | A1* | 8/2009 | Sareen | G06F 3/0481 715/781 |
| 2010/0211872 | A1* | 8/2010 | Rolston | G06F 3/0482 715/702 |
| 2010/0225443 | A1* | 9/2010 | Bayram | G06F 21/316 340/5.83 |
| 2010/0265204 | A1* | 10/2010 | Tsuda | 345/174 |
| 2010/0310136 | A1* | 12/2010 | Tsuda | 382/124 |
| 2011/0124376 | A1* | 5/2011 | Kim | G06F 1/1626 455/566 |
| 2012/0182253 | A1* | 7/2012 | Brosnan | 345/174 |
| 2012/0235987 | A1* | 9/2012 | Lin et al. | 345/419 |
| 2013/0009896 | A1* | 1/2013 | Zaliva | G06F 3/0416 345/173 |
| 2015/0047017 | A1* | 2/2015 | Kim | G06F 21/36 726/19 |
| 2017/0124316 | A1* | 5/2017 | Slaby | G06F 21/32 |

OTHER PUBLICATIONS

Written Opinion of the International Preliminary Examining Authority issued in International Application No. PCT/US2011/047033 on Jul. 5, 2013; 8 pages.

International Preliminary Report on Patentability issued in International Application No. PCT/US2011/047033 on Oct. 1, 2013; 35 pages.

Office Action issued in Canadian Application No. 2844615 on Jun. 12, 2017.

Communication Pursuant to Article 94(3) EPC issued in European Application No. 11745884.4 on Jul. 24, 2017; 10 pages.

* cited by examiner

MANIPULATING SCREEN LAYERS IN MULTI-LAYER APPLICATIONS

CLAIM OF PRIORITY

This application is a U.S. National Stage of PCT/US2011/047033 filed on Aug. 9, 2011.

TECHNICAL FIELD

This disclosure relates to manipulating screen layers in multi-layer applications, and more specifically, to using finger-based substantially unique identification information to provide access to layers of the multi-layer applications.

BACKGROUND

With multi-layer applications (e.g., multi-layer presentations, augmented reality applications, three-dimensional (3D) data presentations, etc.), display layers may be manipulated independently. These layers could belong to a single application or multiple applications. Three-dimensional (3D) data presentations on 3D displays can also be considered to be multi-layer applications. While concept of depth in 3D displays may be mainly artificial, they allow new user interface (UI) presentation models. Slicing 3D UI presentations into layers enables compounding information in 3D objects that could be easily "opened" or "sliced." A similar theory surrounds future holographic displays and associated UI models.

DETAILED DESCRIPTION

In multi-layer applications, such as aggregated multi-layer content, augmented reality applications, 3D virtual objects (3DVO), or holographic images, or other applications, each layer or slice can be selected, displayed, manipulated, and/or accessed based on receiving a tactile user input. The tactile user input can be the touch of one of a plurality of fingers. Each finger of the user can be assigned to a different, corresponding layer of the application. In certain implementations, fingerprint recognition techniques can be used to differentiate each finger and/or to identify the user. Fingerprints can be used to vary the access parameters of a layer of the application (i.e., read only, read/write, etc.) and/or to provide security levels for accessing the layers of the multi-layer application (restrict or permit access to the layer or to certain aspects or data associated with the layer).

Figure 1:
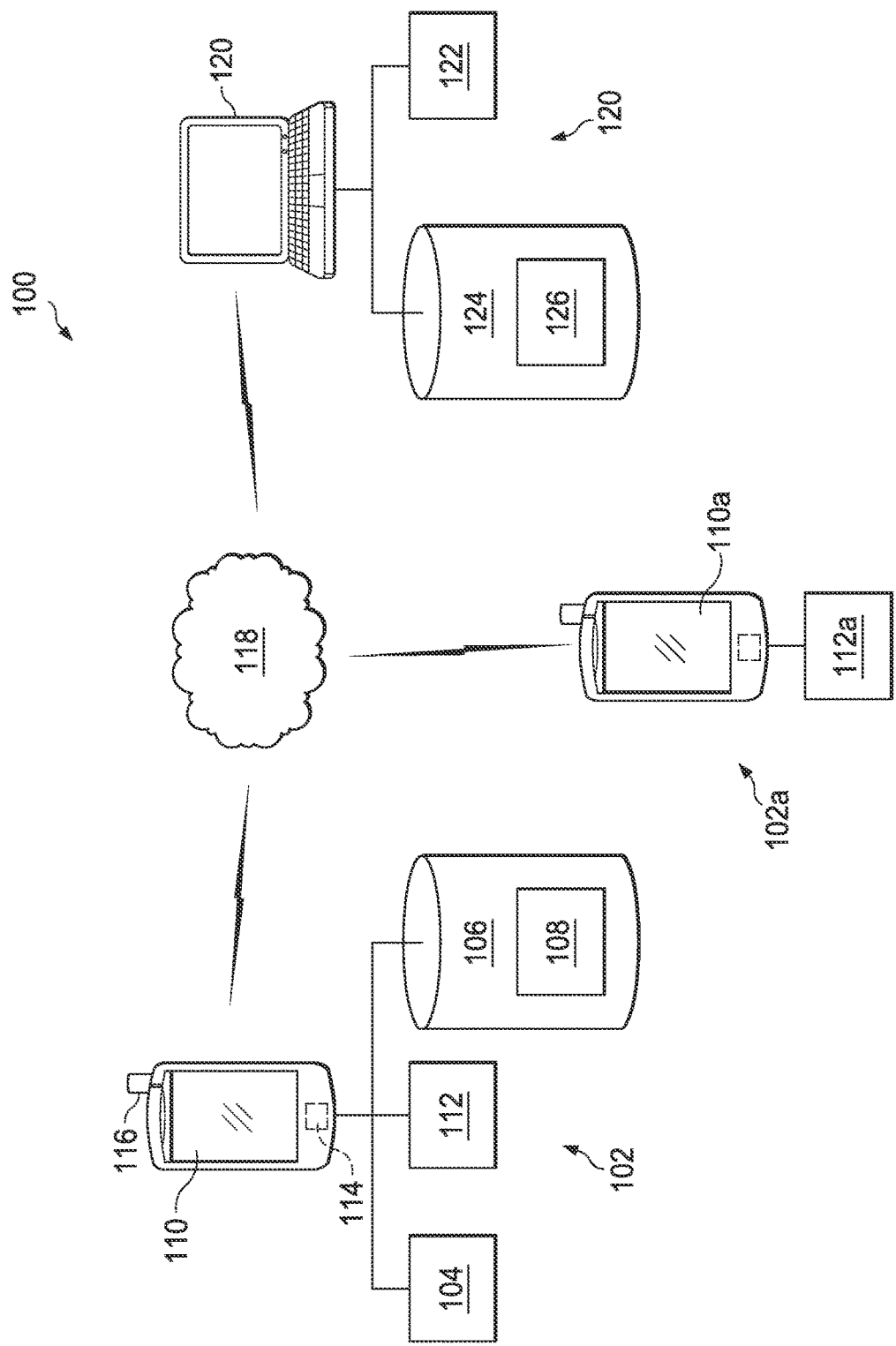
FIG. 1 is a schematic illustration of an environment in which a device may function.

FIG. 1 is a schematic illustration of an environment 100 in which a device 102 may function. Environment 100 includes one or more devices 102 (or 102a) coupled by a network 118 to one or more servers 120. Server 120 may provide services to the user across the network 118. For example, a user may launch and run a hosted multi-layer application 126 on the device 102. The hosted multi-layer application 126 may be displayed on the user device 102, but may be executed on a remote server 120 by one or more processors 122. In those instances, processor 122 is configured to process fingerprint information and communicate that information across the network 118 to the remote server 120. As such, device 102 is operable to send and receive data across the network 118. Remote server 120 may include a memory 124 for storage of fingerprint data received from the device 102.

Device 102 may include a display 110 for displaying a multi-layer presentation, an interface 112 for receiving finger-touch input from a user, and a sensor 114 coupled to the interface 112. The device 102 includes a processor 104 configured to associate the finger with a layer of the multi-layer presentation 108 based on the one or more identifying characteristics. The device 102 also includes a memory 106 for storing the image of the finger, the image including the one or more identifying characteristics of the finger. An image can be any suitable data that can be stored and compared with later generated data. The device 102 may also include an antenna 116 to send and receive signals to and from a wireless network. For example, the device 102 can run multi-layer applications from a remote server, such as server 120, that are displayed on the device 102. Other applications may be run from a remote server 120, such as applications that store and/or process fingerprint information or user identification information.

The device 102 may be any electronic device operable to process and display multi-layer applications. For example, the device 102 may be a mobile user equipment, such as a BLACKBERRY, PLAYBOOK, IPHONE, IPAD, smart-phone, tablet PC, laptop, gaming terminal, or other mobile user equipment. The device 102 may also be a PC or MAC, a workstation, or other device. In general, device 102 includes a processor 104, a display 110, and a memory 106. The processor 104 may be a computing device, microprocessor, central processing unit, graphic control unit, network processor, or other processor for carrying out instructions stored in memory 106. The functions of the processor 104 may include computation, queue management, control processing, graphic acceleration, video decoding, and execution of a sequence of stored instructions from the program kept in the memory module 106. In some implementations, the processor 104 may also be responsible for signal processing including sampling, quantizing, encoding/decoding, and/or modulation/demodulation of the signal. The memory module 106 may include a temporary state device (e.g., random-access memory (RAM)) and data storage. The memory module 106 can be used to store data or programs (i.e., sequences of instructions) on a temporary or permanent basis for use in a device 102. Memory module 106 may be used to store fingerprint images received from the sensor 114. The sensor 114 is configured to sense a finger used to provide the finger-touch input from the user and to create an image of the finger, the image including one or more identifying characteristics of the finger.

Figure 2:
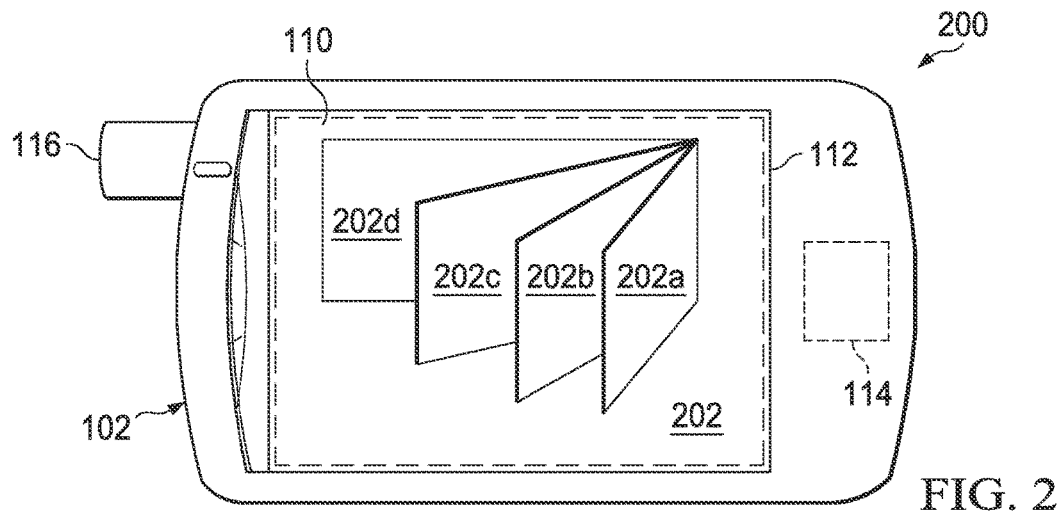
FIG. 2 is a schematic illustration of an example mobile device for providing finger-touch-based application layer access.

FIG. 2 is a schematic illustration 200 of an example mobile device 102 for providing finger-touch-based application layer access. Device 102 includes a display 110 for displaying multi-layer applications or presentations 202 (or other multi-layer applications). Display 110 can have two-dimensional and/or 3D display capabilities. In certain implementations, the display 110 can act as a user interface (UI) for the user to interact with applications displayed on the display 110. For example, the display 110 can be a touch screen, reactive to finger touches, gestures, etc. Gestures include movement of a finger across the display screen, pinching movements, reverse pinching movements, finger tapping, etc. The device 102 can be programmed to associate a particular finger of the user with a particular layer of the application. The device 102 may also include one or more antennas for communicating wirelessly with a network, though device 102 may be able to communicate with a network across a wired connection.

Multi-layer applications 202 may include a multi-layer presentation, augmented reality application, 3D virtual object (3DVO), holographic image, etc. The multi-layer application 202 can be considered to have multiple layers (such as the layers 202a-202d), each of which may include data or metadata, or may include other applications. Each layer of the multi-layer application can be individually (or simultaneously) manipulated, displayed, accessed, etc. A layer can include applications or data that can be displayed, stored, manipulated, operated upon, accessed, etc. as part of a multi-layer application or presentation. A layer may also be a slice of a 3DVO (e.g., a depth or cross-section of a 3DVO). A multi-layer application can be any application that includes a plurality of layers or that can facilitate the overlaying of one or more layers over a pre-existing application (i.e., augmented reality applications).

Device 102 may also include an interface 112 for receiving the finger touches of the user. As mentioned above, the interface 112 may be part of the display 110, such as a touch screen, or may be any suitable interface that receives user input and/or commands. In certain embodiments, the device can include a sensor 114 that is configured to capture an image of the finger for further processing and analysis. In certain embodiments, the sensor 114 may be coupled to the interface 112. That is, in some embodiments, the interface 112 and the sensor 114 may be integrated into the display 110 of the device 102. In other embodiments, the interface and sensor may be a separate component, but still communicably coupled to the device, such as device 102a, which includes a display 110a and a connected fingerprint sensor 112a.

In some embodiments, the sensor 114 could be an optical fingerprint imager. Optical fingerprint imaging involves capturing a digital image of a fingerprint using visible light. This type of sensor may be a specialized digital camera or other optical scanner. The area where the finger is placed may be referred to as a touch surface. In certain implementations, the sensor 114 can include a light-emitting phosphor layer that can illuminate the surface of the finger. The light reflected from the finger passes through the phosphor layer to an array of solid state pixels (e.g., a charge-coupled device or CCD), which captures a visual image of the fingerprint.

In some embodiments, the sensor 114 may be an ultrasonic sensor. Ultrasonic sensors make use of the principles of ultrasonography to create visual images of the fingerprint. Ultrasonic sensors use high frequency sound waves to penetrate the epidermal layer of skin. The sound waves may be generated using piezoelectric transducers, and the reflected energy may also be measured using piezoelectric materials. Since the dermal skin layer may exhibit the same characteristic pattern of the fingerprint, the reflected wave measurements can be used to form an image of the fingerprint.

Sensor 114 may be a capacitance sensor. Capacitance sensors utilize the principles associated with capacitance in order to form fingerprint images. In this method of imaging, the sensor array includes pixels that each act as one plate of a parallel-plate capacitor. The dermal layer (which is electrically conductive) acts as the other plate, and the non-conductive epidermal layer acts as a dielectric. The sensor 114 can be an active capacitance sensor or a passive capacitance sensor.

A passive capacitance sensor uses the principle outlined above to form an image of the fingerprint patterns on the dermal layer of skin. Each sensor pixel is used to measure the capacitance at that point of the array. The capacitance varies between the ridges and valleys of the fingerprint due to the fact that the volume between the dermal layer and sensing element in valleys contains an air gap. The dielectric constant of the epidermis and the area of the sensing element are known values. The measured capacitance values are then used to distinguish between fingerprint ridges and valleys. Active capacitance sensors use a charging cycle to apply a voltage to the skin before measurement takes place. The application of voltage charges the effective capacitor. The electric field between the finger and sensor follows the pattern of the ridges in the dermal skin layer. On the discharge cycle, the voltage across the dermal layer and sensing element is compared against a reference voltage in order to calculate the capacitance. The distance values are then calculated mathematically, and used to form an image of the fingerprint. Active capacitance sensors measure the ridge patterns of the dermal layer like the ultrasonic method. Again, this eliminates the need for clean, undamaged epidermal skin and a clean sensing surface.

Figure 3:
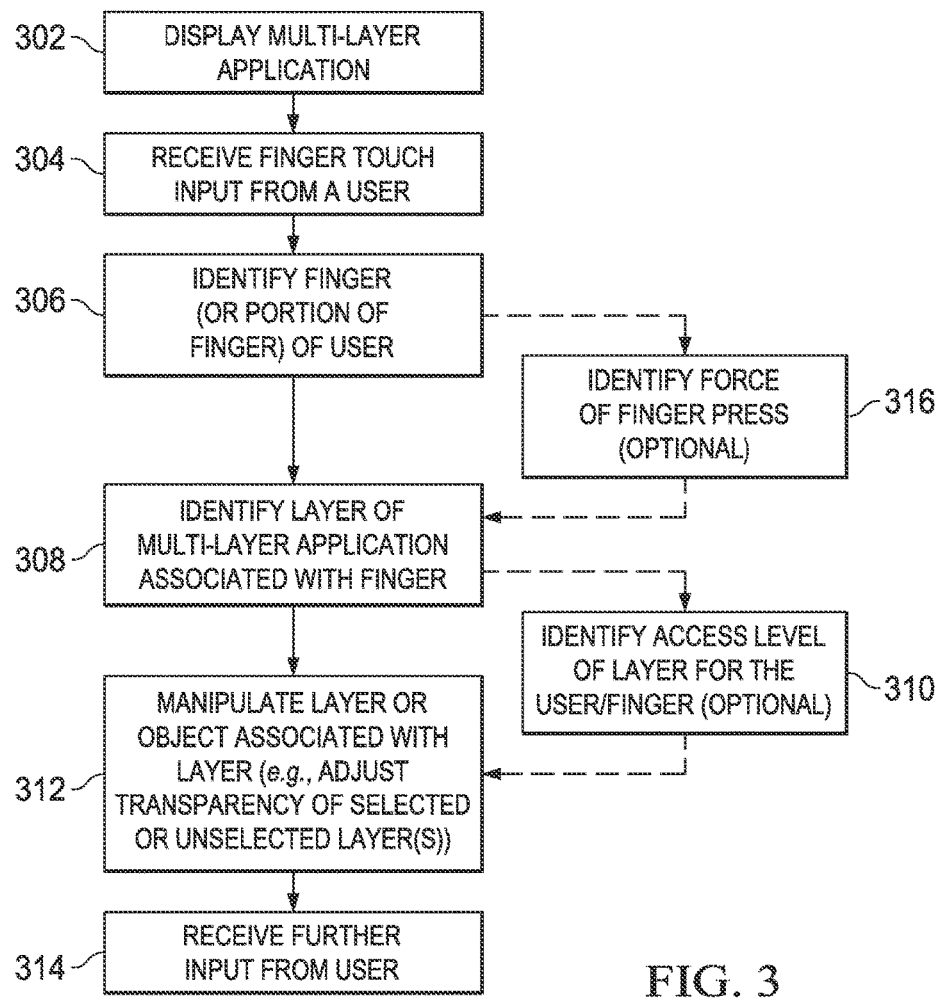
FIG. 3 is a process flow diagram for manipulating screen layers in multi-layer applications.

FIG. 3 is a process flow diagram 300 for manipulating screen layers in multi-layer applications. The term "manipulate" and its variants can include, but is not limited to, actions including displaying, activating, selecting, moving. In certain implementations, the term "manipulate" can also include making unselected layers transparent or making selected layer less transparent. A multi-layer application may be displayed to a user 302. The user may interact with the multi-layer application by touching a finger to an interface coupled to the device running the multi-layer application 304. The interface may be the display or may be a separate touch pad or other device configured to receive a touch indication. The device can sense the finger of the user and identify the finger used 306. The device can identify the finger based on certain substantially unique identification information. For example, the device can image a fingerprint of the finger and compare the fingerprint to pre-existing fingerprint records. The resolution of detail can vary based on implementation. For example, the device can sense information sufficient to identify the user based on identifying characteristics of the fingerprint. Or, if higher resolution is desired, the device can use fingerprint recognition techniques to differentiate one finger of the user from another. Matching algorithms are used to compare previously stored templates of fingerprints against candidate fingerprints for authentication purposes. In order to do this, either the original image must be directly compared with the candidate image or certain features must be compared. Pattern-based algorithms compare the basic fingerprint patterns (arch, whorl, and loop) between a previously stored template and a candidate fingerprint. This requires that the images be aligned in the same orientation. To do this, the algorithm finds a central point in the fingerprint image and centers on that. In a pattern-based algorithm, the template contains the type, size, and orientation of patterns within the aligned fingerprint image. The candidate fingerprint image is graphically compared with the template to determine the degree to which they match. In some embodiments, described further below, a user can touch the device with varying degrees of pressure, which exposes varying amounts of finger surface area 316. The device can provide access to layers based on the number of identifying/distinguishing features of the finger it recognizes.

Based on the identification of the finger, the device can identify an associated layer of the multi-layer application 308. For example, an identification of a user's index finger can prompt the device to provide access to an associated layer of the multi-layer application. An identification of a ring finger can similarly prompt the device to provide access to a different layer of the multi-layer device. Each finger of the user can be associated with a different layer.

In some implementations, an identification of any finger belonging to the user can prompt the device to identify an authorized security level for the associated layer(s) 310. For example, an identification of an index finger belonging to user A may provide read-only access to a first layer of the application. An identification of an index finger belonging to user B, however, may provide read/write access to the first layer of the application. Fingerprint recognition can be used to assign different security levels to various layers in the multi-layer application (e.g., read versus read/write), or to create/display available layers according to the user's security profile/role. In another example, an initial finger touch could be used to identify the user, which can prompt the device to identify a global security setting for any layer available to the user. Subsequent touches by the same user can initiate display of associated layers having applied the appropriate security settings. In some embodiments, the identification of any finger can identify the user. Access to the layer of the multi-layer application may be granted in accordance with the level of access authorization associated with the user.

The identified (i.e., selected) layer is manipulated 312. The selection of the identified (i.e., selected) layer is confirmed. In certain embodiments, the selection of the desired layer is confirmed to the user by increasing the transparency of the other layers. In some embodiments, the layers may be displayed in a semi-transparent manner, and the transparency of the selected layer can be reduced. This change in the transparency (of either the selected or unselected layers) can confirm the selection of the desired layer. In some embodiments, the finger-touch prompts manipulation of objects associated with the identified layer. For example, the area segment or object on the identified layer where the finger touch was applied can be identified. Associated logic can be executed, as appropriate. Such logic can include, but is not limited to, expanding the object (or area) to full screen, launching the application, and/or other operations.

To access items on the selected layer, the user may use a subsequent finger touch to activate applications or manipulate icons or perform other interactive functions within the layer 314. Likewise, the user can use hard or soft keys on the device or use another user interface, such as a mouse, to interact with the selected layer. In some embodiments, moving the finger could cause one of the two modes (i.e., switching between modes): moving the entire layer (relative to other layers that are fixed) or moving the focus within the layer to select various items that could be manipulated.

Figure 4:
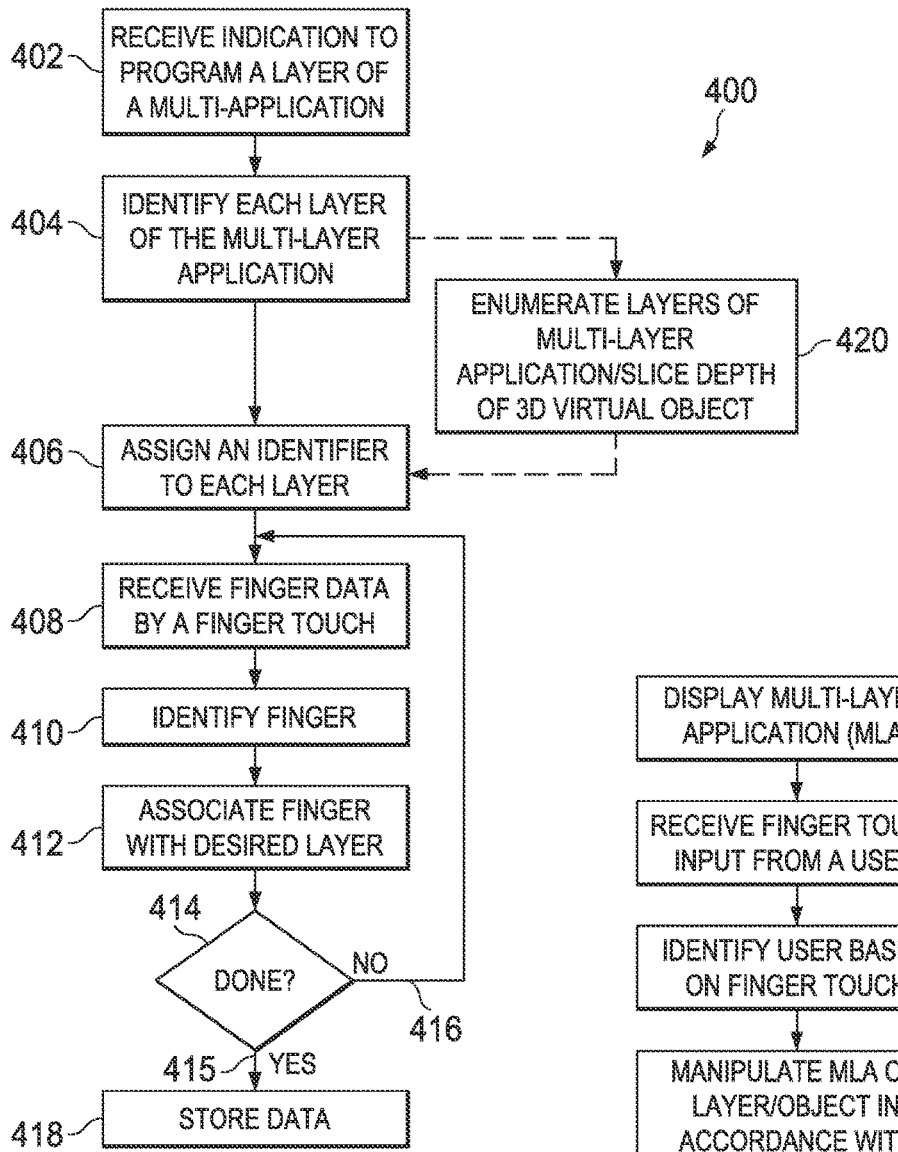
FIG. 4 is a process flow diagram for assigning fingers to screen layers in multi-layer applications.

FIG. 4 is a process flow diagram 400 for assigning fingers to screen layers in multi-layer applications. An indication that a user wants to assign fingers to layers of a multi-layer application can be received 402. In a multi-layer application, each layer of the multi-layer application can be identified 404. Each layer of the multi-layer application can be enumerated 420. For 3D virtual objects, a slice may be taken to identify a cross-section of the 3D virtual object, revealing its depth. A unique identifier can be assigned to each layer (or slice) 406. The identifier can be one or a sequence of alphanumeric characters. Once each layer has been identified, the device can prompt the user to touch an interface to provide the device finger identification information (such as a fingerprint). The interface may be the display of the device or may be a separate component communicably coupled to a processor of the device. The finger is sensed by a sensor coupled to the interface 408. The sensor can create an image of the finger, the resolution of which depends on the techniques used to take the image. Examples of such techniques are described above, and include (but are not limited to) optical imaging, ultrasonic imaging, and capacitance imaging. The finger can be identified 410. For example, the user can input the name of the finger (i.e., right index finger) into an input on the device and assign the name to the image of the finger. Other designators can be used. Alternatively, the device may request that the user use a particular finger and subsequently establish a designator for the fingerprint automatically. The device correlates the fingerprint identification to a desired layer of the multi-layer application 412. The device may again prompt the user to select a layer the user desires to be associated with the scanned image. Other techniques for assigning a finger to a layer are readily apparent. The device may prompt the user to continue assigning fingers to layers 414. If the user is finished 415, the device stores the image and the user profile in a memory 418. If the user wishes to continue assigning fingers to layers 416, the device can re-cycle the assignment process flow 408

Once the device has been configured to recognize finger touches, the device can then receive a finger-touch-initiated request to access a layer of the multi-layer application, the finger-touch-initiated request including receiving a touch of a finger. The finger used to make the finger-touch-initiated request can be compared to the distinguishing characteristics stored on the device. The first layer of the multi-layer application can be manipulated (or operated on) if the finger used to make the finger-touch-initiated request matches the distinguishing characteristics associated with the first layer. The one or more distinguishing characteristics of the finger of the user include sufficient information to distinguish the finger from another finger. In certain implementations, an image of the finger can be captured and analyzed to identify the one or more distinguishing characteristics. Capturing the image of the finger includes at least one of optical imaging, ultrasonic imaging, or capacitance imaging.

Figure 5:
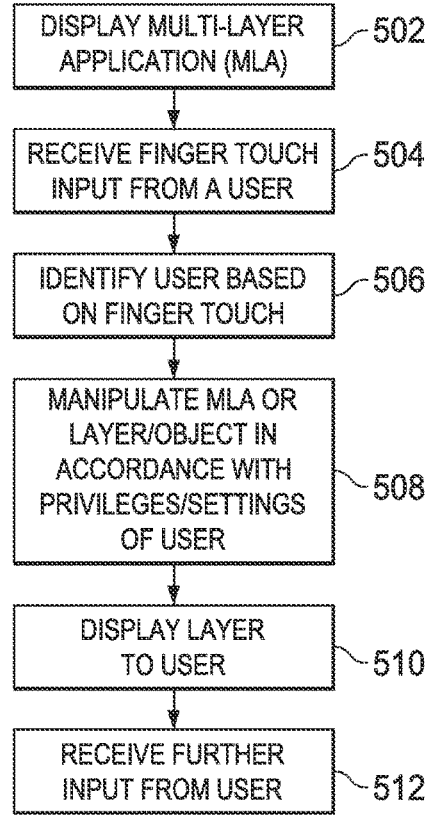
FIG. 5 is a process flow diagram for identifying a user based on a finger-touch input to provide access to a multi-layer application on a mobile device.

In certain implementations, the resolution of the finger-touch sensor may not be high enough to differentiate between fingers, but may still be high enough to provide fingerprint data sufficient to identify a user (or differentiate users). FIG. 5 is a process flow diagram 500 for identifying a user based on a finger-touch input to provide access to a multi-layer application on a mobile device. A multi-layer application can be displayed to a user 502. The mobile device may receive a finger-touch input from the user 504. The mobile device can receive the finger touch input from a sensor coupled to the display (e.g., a touch-sensitive display) or from a touch pad on, or coupled to, the device, or from other mechanisms, such as a fingerprint scanner. The mobile device can receive a fingerprint (or portion of a fingerprint) based on the finger touch. The mobile device can process the fingerprint to identify the user based on distinguishing/identifying characteristics of the fingerprint or based on a comparison of the fingerprint with recorded data. In so doing, the device can identify the user 506. The device may then manipulate the multi-layer application (or layer or associated object) in accordance with privileges and settings of the user 508. The privileges may include access rights that may be based on the user's identity, which is identified based on the fingerprint. For example, a first user may be granted read-only rights on a certain device for a certain application or layer of an application; whereas, a second user may be provided read and write access to the application or layer of the application. Settings may include display settings or other personalization parameters or other settings. Other users may have access to the multi-layer application, but may have different access/usage rights, settings, privileges, etc.

The finger touch described above can be from a first finger of a plurality of fingers of the user. A second finger of the plurality of fingers of the user can be assigned to a second layer of the multi-layer application. In certain embodiments, the multi-layer application is a first multi-layer application and the finger is a first finger. A second layer of a second multi-layer application can be identified, the second layer being one of a plurality of user interface layers of the second multi-layer application. The device can receive, from the user, a touch of a second finger. The second finger can be assigned to the second layer of the second multi-layer application.

The selected layer can be displayed to the user 510. In certain implementations, displaying the layer to the user includes decreasing the transparency of the selected layer or increasing the transparency of layers that were not selected. The user may then provide further input to the device 512. For example, the user may use an input device or technique to navigate the multi-layer application. For example, the user may use a keypad to enter commands. The user may use a mouse or trackball to move a pointer or cursor; a touch pad (e.g., a laptop mouse pad) or other sensory device; a stylus, or other input device or technique. The layer of the multi-layer application may be operated upon based on the input from the user. Operating on the layer includes (but is not limited to) providing access to the layer (and to underlying data or applications thereof) to the user or moving the layer relative to other layers of the multi-layer application. Moving the layer includes displaying a different layer to the user based on the input. Operating on the layer can also include changing the focus of the layer relative to other layers of the multi-layer application. The device may also receive a tactile input from the user, and may operate on the layer of the multi-layer application associated with the tactile input.

The multi-layer application can include a user interface that contains a 3DVO, and the first layer is a first slice of the 3DVO. The first slice of the 3DVO can be representative of a cross-section of the virtual object. The multi-layer application can also include a user interface that contains a holographic image and wherein identifying a first layer of a multi-layer application includes cutting the holographic image into a predefined number of layers, and enumerating each of the predefined layers. The multi-layer application is an augmented reality application.

Alternative embodiments may provide varying functionality without deviating from the scope of this disclosure. For example, a single finger may be assigned to different layers due to the existence of multiple substantially unique identifiers on a single fingerprint. In certain implementations, a user can use an entire fingerprint to identify herself. Subsequently, by varying degrees of pressure, the user can use a single finger to access different layers or to access layers with differing security levels. A light touch, for example, may only permit scanning of a small area of the finger. The resulting analysis may reveal that there are sufficient characteristic markers to provide access to a first layer. (In general, the use of the word "first" to modify "layer" does not necessarily refer to a top layer or layer one of the multi-layer application; rather, the term "first" is meant to signify a layer, and to provide a qualitative differential between multiple layers.) A harder touch permits scanning more surface area of the finger, revealing more characteristic markers. In turn, the device can associate a higher number of markers with a different layer or with a different security level. Likewise, touching one side of the finger versus another side may provide different markers from which the device can extrapolate the associated layers requested by the user. For example, a full fingerprint scan may reveal 6 markers: A, B, C, D, E, and F. A light touch may only reveal markers A-C, providing access to layer 1. Whereas, a heavy touch reveals A-F, which provides access to layer 2. A touch may also reveal markers A-C, whereas a different touch may reveal markers D-F. Each set of revealed markers may be associated with a layer or a security level.

Other embodiments include instances where no fingerprint recognition is available, and the best resolution available only permits identification of the user. In such embodiments, once the user has been identified, the user can press a key (e.g., a number key) to indicate a layer. She may then navigate the layer using a touch screen or by hard/soft keys. Other predefined keys can be used to navigate up and down between layers. Alternatively, the device can be programmed to recognize gestures, such as taps or finger swipes, to navigate up and down between layers.

Although the elements of the device 102 are illustrated as having several separate functional elements, one or more of the functional elements may be combined and may be implemented by combinations of hardware circuitry, software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of device 102 may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

The forgoing description, as well as the drawings, sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Some embodiments may be implemented in one or a combination of hardware, firmware and software. These embodiments may also be implemented as instructions stored on a computer-readable storage medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

What is claimed is:

1. A method performed on a device, the method comprising:
    identifying each of a plurality of user interface layers of a multi-layer application, the multi-layer application having the plurality of user interface layers;
    assigning each of a plurality of fingers of a user to a single user interface layer of the plurality of user interface layers;
    receiving, from the user using a touchscreen, a finger-touch-initiated request for access to a layer of the multi-layer application on the device;
    identifying the user and a finger from the plurality of fingers of the user based on one or more characteristics of the finger-touch-initiated request;
    determining a single user interface layer from the plurality of user interface layers assigned to the identified finger;
    determining a security level assigned to the user based on at least an amount of finger surface area touching the touchscreen associated with the finger-touch-initiated request; and
    operating on the single user interface layer based on user identification and the security level.

2. The method of claim 1, further comprising operating on unselected layers of the multi-layer application.

3. The method of claim 2, wherein operating on unselected layers of the multi-layer application includes changing a transparency of the unselected layers.

4. The method of claim 1, wherein prior to operating on the layer, the plurality of user interface layers are displayed semi-transparently, and wherein operating on the layer associated with the identified finger of the user includes reducing a level of transparency of the layer.

5. The method of claim 1, wherein the identified finger is a first finger and the layer associated with the first finger is a first layer, the method further comprising:
    receiving, from the user, a request for access to a second layer; and
    identifying a second finger of the user used to provide the request, the second finger being one of a plurality of fingers and associated with the second layer, the second finger different from the first finger and the second layer different from the first layer.

6. The method of claim 5, wherein the first layer is a layer of a first multi-layer application and the second layer is a layer of a second multi-layer application.

7. The method of claim 1, wherein identifying the finger of the user includes identifying at least a portion of a fingerprint of the finger, the portion of the fingerprint distinguishing the finger from other fingers.

8. The method of claim 7, wherein the portion of the fingerprint identifies a portion of the finger and distinguishes the portion of the finger from other portions of the finger.

9. The method of claim 7, wherein identifying at least a portion of a fingerprint of the finger comprises:
    capturing an image of the fingerprint;
    identifying one or more characteristic features of the fingerprint including at least one of patterns or minutia features; and
    identifying the finger based on the identified characteristic features.

10. The method of claim 9, wherein capturing an image of the fingerprint includes at least one of optically imaging, ultrasonic imaging, or capacitance imaging.

11. The method of claim 1, wherein the security level is associated with a level of authorized access including one of a read-only level or a read-write level.

12. The method of claim 1, further comprising providing access to the layer based on the security level associated with the user, wherein providing access includes displaying the layer if the user has authorization to view it.

13. The method of claim 1, wherein the multi-layer application includes a user interface having a three-dimensional virtual object and the layer is a slice of the three-dimensional virtual object.

14. The method of claim 1, wherein the multi-layer application includes a user interface having a holographic image.

15. The method of claim 1, wherein the multi-layer application is an augmented reality application.

16. The method of claim 1, wherein operating on the layer associated with the identified finger of the user on the device includes activating the layer.

17. The method of claim 16, wherein activating the layer includes changing a transparency of other layers of the multi-layer application.

18. The method of claim 1 further comprising providing access to items associated with the operated upon layer based on receiving user interaction on the device.

19. The method of claim 18, wherein receiving user interaction on the device includes receiving a tactile gesture on the device, the gesture including at least one of a tap, a pinch, or a swipe.

20. The method of claim 19, wherein the gesture causes the layer to move relative to other layers displayed on the device.

21. The method of claim 19, wherein the gesture changes the focus of the layer relative to other layers displayed on the device.

22. The method of claim 19, wherein the gesture causes a change in the layer selected by the user.

23. A method implemented on a device, the method comprising:
    identifying each of a plurality user interface layers of a multi-layer application, wherein identifying includes identifying a first layer of the multi-layer application;
    receiving, from a user, a touch of a finger on a touchscreen;
    identifying one or more distinguishing characteristics of the finger, the one or more distinguishing characteristics including an amount of finger surface area touching the touchscreen associated with the touch of the finger;
    storing the one or more distinguishing characteristics of the finger;
    associating the one or more distinguishing characteristics of the finger with the first layer, a user identification, and a security level, the security level based on the amount of finger surface area; and
    providing access to the one or more distinguishing characteristics of the finger stored on the device for identifying the finger.

24. The method of claim 23 further comprising:
  receiving a finger-touch-initiated request to access a layer of the multi-layer application, the finger-touch-initiated request including receiving the touch of the finger;
  comparing the finger used to make the finger-touch-initiated request to the distinguishing characteristics stored on the device; and
  manipulating the first layer of the multi-layer application if the finger used to make the finger-touch-initiated request matches the distinguishing characteristics associated with the first layer.

25. The method of claim 23, wherein the one or more distinguishing characteristics of the finger of the user include sufficient information to distinguish the finger from another finger.

26. The method of claim 23 further comprising capturing an image the finger and analyzing the image to identify the one or more distinguishing characteristics.

27. The method of claim 26, wherein capturing the image of the finger includes at least one of optical imaging, ultrasonic imaging, or capacitance imaging.

28. A method implemented on a device, the method comprising:
  identifying each of a plurality user interface layers of a multi-layer application, wherein identifying includes identifying a first layer of the multi-layer application;
  receiving, from a user, a touch of a finger on a touchscreen; and
  assigning the finger and a security level of the user to the first layer of the multi-layer application, the security level based on at least an amount of finger surface area touching the touchscreen associated with the touch of the finger.

29. The method of claim 28, wherein the finger is a first finger of a plurality of fingers of the user, the method further comprising assigning a second finger of the plurality of fingers of the user to a second layer of the multi-layer application.

30. The method of claim 28, wherein the multi-layer application includes a user interface having a three-dimensional virtual object, and the first layer is a first slice of the three-dimensional object.

31. The method of claim 30, wherein the first slice of the three-dimensional virtual object is representative of a cross-section of the virtual object.

32. The method of claim 28, wherein the multi-layer application includes a user interface having a holographic image and wherein identifying the first layer of the multi-layer application includes cutting the holographic image into a predefined number of layers, and displaying each of the predefined layers.

33. The method of claim 28, wherein the multi-layer application is an augmented reality application.

34. The method of claim 28, wherein the multi-layer application is a first multi-layer application and the finger is a first finger, and the method further comprises:
  identifying a second layer of a second multi-layer application, the second layer being one of a plurality of user interface layers of the second multi-layer application;
  receiving, from the user, a touch of a second finger; and
  assigning the second finger to the second layer of the second multi-layer application.

35. A device comprising:
  a display for displaying a multi-layer presentation;
  an interface for receiving finger-touch inputs from a user;
  a sensor coupled to the interface configured to:
    sense a plurality of fingers used to provide the finger-touch inputs from the user, and
    create an image of the plurality of fingers, the image for each finger including one or more identifying characteristics of that finger, the one or more identifying characteristics including an amount of finger surface area touching the interface associated with the finger-touch input;
  a processor configured to:
    identify each of a plurality of layers of the multi-layer presentation; and
    assign each of the plurality of fingers to a single layer of the multi-layer presentation based on the one or more identifying characteristics for that finger; and
  a memory for storing the images of the plurality of fingers and an associated security level for the user based on the amount of finger surface area, the image including the one or more identifying characteristics of the finger.

36. The device of claim 35, wherein the interface for receiving finger-touch input from the user is the display.

37. The device of claim 36, wherein the display is a touch screen.

38. The device of claim 35, wherein the interface for receiving finger-touch inputs from the user is a fingerprint scanner.

39. The device of claim 35, wherein the sensor is one of an optical sensor, an ultrasonic sensor, or a capacitance sensor.

40. A device comprising:
  a display for displaying a multi-layer presentation, the multi-layer presentation having a plurality of layers;
  an interface for receiving finger-touch input from a user;
  a sensor coupled to an interface configured to:
    receive a finger-touch input from a user, and
    create an image of a finger used to input the finger touch, the image including one or more identifying characteristics of the finger, the one or more identifying characteristics including an amount of finger surface area touching the interface associated with the finger touch;
  a memory for storing the image of the finger and a security level of the user, the security level based on the amount of finger surface area, the image including the one or more identifying characteristics of the finger; and
  a processor configured to:
    identify each of the plurality of layers of the multi-layer presentation,
    associate the finger with a layer of the multi-layer presentation,
    analyze the one or more identifying characteristics of the finger, and
    compare the one or more identifying characteristics with images of fingerprints stored in a memory.

41. The device of claim 40, wherein the processor is further configured to identify the layer of the multi-layer application associated with the finger used to input the finger touch.

42. The device of claim 40, wherein the device is a multiplayer gaming terminal.

43. A method implemented on a device, the method comprising:
  receiving finger touches on a display displaying a multi-layer presentation, the multi-layer presentation having a plurality of layers;

identifying each of the plurality of layers of the multi-layer presentation; and for each finger touch;

determining a security level of a user associated with the corresponding finger touch based on at least an amount of finger surface area touching the display associated with the finger touch; and manipulating a layer of the multi-layer presentation associated with the corresponding finger touch and based on the security level.

44. A method implemented on a device, the method comprising:

receiving a finger-touch input from a user using a touch-screen;

identifying the user based on the finger-touch input;

determining a security level of the user based on at least an amount of finger surface area touching the touch-screen associated with the finger-touch input;

receiving a key-stroke input from the user;

identifying a layer of a multi-layer application based on the key-stroke; and operating on the identified layer of the multi-layer application based on user identification and the security level.

45. The method of claim 44, wherein operating on the layer includes providing access to the layer to the user.

46. The method of claim 44, wherein operating on the layer includes moving the layer relative to other layers of the multi-layer application.

47. The method of claim 46, wherein moving the layer includes displaying a different layer to the user based on the key-stroke input.

48. The method of claim 44, wherein operating on the layer includes changing a focus of the layer relative to other layers of the multi-layer application.

49. The method of claim 44, further comprising:

receiving a tactile input from the user; and operating on the layer of the multi-layer application associated with the tactile input.

50. The method of claim 44, wherein manipulating the multi-layer application based on the user identification includes providing access to a layer of the multi-layer application or an object associated with the layer.

51. The method of claim 44, wherein manipulating the multi-layer application based on the user identification includes manipulating the multi-layer application based on privileges associated with the user.

* * * * *

UNITED STATES PATENT AND TRADEMARK OFFICE
CERTIFICATE OF CORRECTION

PATENT NO. : 9,778,813 B2  
APPLICATION NO. : 14/237398  
DATED : October 3, 2017  
INVENTOR(S) : Michael Shenfield and Arnold Sheynman Page 1 of 1

It is certified that error appears in the above-identified patent and that said Letters Patent is hereby corrected as shown below:

In the Claims

In Column 11, Line 18, in Claim 26, after "image" insert -- of --.

In Column 13, Line 3, in Claim 43, delete "touch;" and insert -- touch: --, therefor.

Signed and Sealed this  
Twenty-fourth Day of March, 2020

Andrei Iancu  
*Director of the United States Patent and Trademark Office*